US010384424B2

(12) United States Patent
Larsson et al.

(10) Patent No.: US 10,384,424 B2
(45) Date of Patent: Aug. 20, 2019

(54) OXYGEN AND WATER VAPOUR BARRIER FILMS WITH LOW MOISTURE SENSITIVITY FABRICATED FROM SELF-CROSS-LINKING FIBRILLATED CELLULOSE

(71) Applicant: BILLERUDKORSNAS AB, Solna (SE)

(72) Inventors: Per Larsson, Danderyd (SE); Lars Wagberg, Stockholm (SE)

(73) Assignee: BillerudKorsnäs AB, Solna (SE)

( * ) Notice: Subject to any disclaimer, the term of this patent is extended or adjusted under 35 U.S.C. 154(b) by 417 days.

(21) Appl. No.: 14/916,689

(22) PCT Filed: Sep. 5, 2014

(86) PCT No.: PCT/SE2014/051023
§ 371 (c)(1),
(2) Date: Mar. 4, 2016

(87) PCT Pub. No.: WO2015/034426
PCT Pub. Date: Mar. 12, 2015

(65) Prior Publication Data
US 2016/0214357 A1  Jul. 28, 2016

(30) Foreign Application Priority Data

Sep. 6, 2013  (SE) ...................... 1300586

(51) Int. Cl.
| B32B 23/08 | (2006.01) |
| C08B 15/02 | (2006.01) |
| C08B 15/10 | (2006.01) |
| C08J 5/18 | (2006.01) |
| D21H 27/10 | (2006.01) |
| D21H 27/38 | (2006.01) |
| D21H 11/18 | (2006.01) |
| D21H 21/16 | (2006.01) |
| C08L 1/04 | (2006.01) |
| B32B 27/12 | (2006.01) |
| B32B 27/36 | (2006.01) |
| B32B 5/00 | (2006.01) |
| B32B 5/02 | (2006.01) |
(Continued)

(52) U.S. Cl.
CPC ............... *B32B 23/08* (2013.01); *B32B 5/00* (2013.01); *B32B 5/02* (2013.01); *B32B 7/00* (2013.01); *B32B 7/02* (2013.01); *B32B 9/00* (2013.01); *B32B 9/04* (2013.01); *B32B 23/00* (2013.01); *B32B 23/02* (2013.01); *B32B 23/04* (2013.01); *B32B 27/00* (2013.01); *B32B 27/06* (2013.01); *B32B 27/12* (2013.01); *B32B 27/16* (2013.01); *B32B 27/26* (2013.01); *B32B 27/30* (2013.01); *B32B 27/306* (2013.01); *B32B 27/32* (2013.01); *B32B 27/34* (2013.01); *B32B 27/36* (2013.01); *B32B 29/02* (2013.01); *C08B 15/02* (2013.01); *C08B 15/10* (2013.01); *C08J 5/18* (2013.01); *C08L 1/04* (2013.01); *D21H 11/18* (2013.01); *D21H 21/16* (2013.01); *D21H 27/10* (2013.01); *D21H 27/38* (2013.01); *B32B 2262/062* (2013.01); *B32B 2307/7242* (2013.01); *B32B 2307/7244* (2013.01); *B32B 2307/7246* (2013.01); *B32B 2307/7248* (2013.01); *B32B 2439/00* (2013.01); *B32B 2439/70* (2013.01); *B32B 2439/80* (2013.01); *B32B 2553/00* (2013.01); *C08J 2301/04* (2013.01); *C08L 2205/16* (2013.01)

(58) Field of Classification Search
CPC ......... B32B 23/00; B32B 23/02; B32B 23/04; B32B 23/08; B32B 27/12; B32B 27/306; B32B 27/32; B32B 27/34; B32B 27/36; B32B 27/00; B32B 27/06; B32B 27/16; B32B 27/26; B32B 27/30; B32B 29/02; B32B 5/00; B32B 5/02; B32B 7/00; B32B 7/02; B32B 9/00; B32B 9/04; B32B 2262/062; C08L 1/04; C08L 2205/16; C08B 15/02; C08B 15/10; C08J 5/18; D21H 27/10; D21H 27/38; D21H 11/18; D21H 21/16
See application file for complete search history.

(56) References Cited

U.S. PATENT DOCUMENTS

2007/0184220 A1\* 8/2007 Cleveland ............... B32B 27/08
428/34.2
2011/0198533 A1  8/2011 Nachtkamp et al.
(Continued)

FOREIGN PATENT DOCUMENTS

CN  102264821 A  11/2011
EP  2 184 299 A1  5/2010
(Continued)

OTHER PUBLICATIONS

Kim et al. Periodate Oxidation of Crystalline Cellulose. Biomacromolecules, 2000, 1, 488-492.\*
Yang, Han. Investigation and characterization of oxidized cellulose and cellulose nanofiber films. Masters thesis McGill University, Department of Chemistry. Aug. 2011.\*
First Notification of Office Action corresponding to Chinese Application No. 201480053917.6 dated May 25, 2017.
(Continued)

*Primary Examiner* — Amina S Khan
(74) *Attorney, Agent, or Firm* — Myers Bigel, P.A.

(57) ABSTRACT

There is provided a package material comprising an oxygen barrier polymer film, wherein the film comprises a polymer obtainable by a process comprising the steps of: a) oxidizing cellulose fibers to ultimately obtain cross-linked cellulose; and b) homogenizing the product of step a) to obtain fibrils in a width range of 1 nm to 150 nm. A corresponding use is also provided.

16 Claims, 7 Drawing Sheets

(51) Int. Cl.
  *B32B 7/00*   (2019.01)
  *B32B 7/02*   (2019.01)
  *B32B 9/00*   (2006.01)
  *B32B 9/04*   (2006.01)
  *B32B 23/00*  (2006.01)
  *B32B 23/02*  (2006.01)
  *B32B 23/04*  (2006.01)
  *B32B 27/00*  (2006.01)
  *B32B 27/06*  (2006.01)
  *B32B 27/16*  (2006.01)
  *B32B 27/26*  (2006.01)
  *B32B 27/30*  (2006.01)
  *B32B 27/32*  (2006.01)
  *B32B 27/34*  (2006.01)
  *B32B 29/02*  (2006.01)

(56) References Cited

U.S. PATENT DOCUMENTS

| 2013/0004687 A1 | 1/2013 | Oomori et al. |
| 2013/0025807 A1 | 1/2013 | Wernersson et al. |

FOREIGN PATENT DOCUMENTS

| EP | 2 371 892 A1 | 10/2011 |
| JP | 2001-226893 | 8/2001 |
| JP | 2009-050714 | 3/2009 |
| JP | 2009-057552 A | 3/2009 |
| JP | 2010-167411 A | 8/2010 |
| JP | 2011-212569 | 10/2011 |
| JP | 2012-011651 | 1/2012 |
| WO | WO 2011/078770 A1 | 6/2011 |
| WO | WO 2011/088889 A1 | 7/2011 |
| WO | WO 2012/119229 A1 | 9/2012 |
| WO | WO 2012/156880 A1 | 11/2012 |

OTHER PUBLICATIONS

Larsson et al. "Ductile cellulose nanocomposite films fabricated from nanofibrillated cellulose after partial conversion to dialcohol cellulose" Abstract for Oral presentation No. CELL-274 under the session Composites from Natural Resources held Apr. 11, 2013 at 245th ACS National Meeting and Exposition, Apr. 7-11, 2013, New Orleans, USA, Abstract of Papers of the American Chemical Society, ISSN: 0065-7727, Retreived from: Chemical abstracts [CD-ROM], Abstract No. 2013:474751, Entered STN: Mar. 29, 2013; abstract.

Larsson et al. "Ductile All-Cellulose Nanocomposite Films Fabricated from Core-Shell Structured Cellulose Nanofibrils", *Biomacromolecules* 15:2218-2223 2014.

International Search Report for PCT/SE2014/051023 dated Dec. 4, 2014.

International Preliminary Report on Patentability for PCT/SE2014/051023 dated Sep. 1, 2015.

Aulin et al. "Oxygen and oil barrier properties of microfibrillated cellulose films and coatings", Cellulose 17:550 (2010).

Larsson et al. "Oxygen and Water Vapour Barrier Films with Low Moisture Sensitivity Fabricated from Self-Cross-Linking Fibrillated Cellulose", 15th Fundamental Res. Symp.: Adv. Pulp Paper Res., Cambridge, UK, The Pulp and Paper Fundamental Research Society, 851-866 (2013).

Larsson et al. "Improved barrier films of cross-linked cellulose nanofibrils: a microscopy study", Green Materias, http://dx.doi.org/10.1680/gmat.14.00018 (2014).

Office Action corresponding to Japanese Application No. 2016-540850 dated Jun. 14, 2018.

* cited by examiner

OXYGEN AND WATER VAPOUR BARRIER FILMS WITH LOW MOISTURE SENSITIVITY FABRICATED FROM SELF-CROSS-LINKING FIBRILLATED CELLULOSE

STATEMENT OF PRIORITY

This application is a 35 U.S.C. § 371 national phase application of PCT Application No. PCT/SE2014/051023 filed Sep. 5, 2014, which claims priority to Swedish Application No. 1300586-3 filed Sep. 6, 2013, the entire contents of each of which is incorporated by reference herein.

BACKGROUND

The development of novel bio-based packaging and barrier materials that can compete with, and replace, conventional non-renewable materials is a great challenge. One of the most severe shortcomings of carbohydrate-based materials is their sensitivity to moisture. At low relative humidity various films made from starches, hemicelluloses, dissolved cellulose and fibrillated cellulose offer excellent barriers against oxygen, but as soon as the relative humidity increases, carbohydrates start to adsorb moisture and this leads to a swelling of the film and a subsequent increase in gas permeability [1-11]. To prevent water vapour transmission, carbohydrate-based films are often considered to be so poor that few researchers even make the effort to measure it, and the amount of experimental data is hence limited [2, 8, 10-13], especially over a broad relative humidity range.

SUMMARY

The present inventors have noted that there are, however, ways of reducing the affinity of cellulose to water and the water diffusivity. A commonly used approach is by covalent cross-linking, which is a well-known route to increase the dimensional stability in the face of changes in moisture content, and to reduce the diffusion of moisture [14-18]. Yang et al. [13] recently added cross-linking chemicals to cross-link fibrillar films from well-dispersed, highly charged fibrils, and the water vapour transmission was significantly lowered. Unfortunately, barrier properties were evaluated only at 50% RH, i.e. the effect of a lower moisture sorption and film swelling under high humidity was not explored. Chemical modifications such as esterification and grafting have also been explored to improve water-vapour-barrier properties [11, 19, 20], but critical mechanical and oxygen-barrier-properties were sacrificed. Another widely used approach with polysaccharides is to disperse layered silicates in the matrix polymer [7, 21, 22]. However, the dispersion of inorganic platelets in the matrix polymer and the orientation of the platelets in the final films presented serious limitations to the final properties [7, 21].

The present inventors have explored the introduction of cross-links between aldehydes, induced by periodate oxidation of the C2-C3 bonds, and hydroxyl groups [16, 23, 24] on a fibril level. A schematic oxidation and cross-linking reaction is shown in Scheme 1. To achieve films with high density and few large pores, the modified fibres were fibrillated in a homogeniser prior to film fabrication.

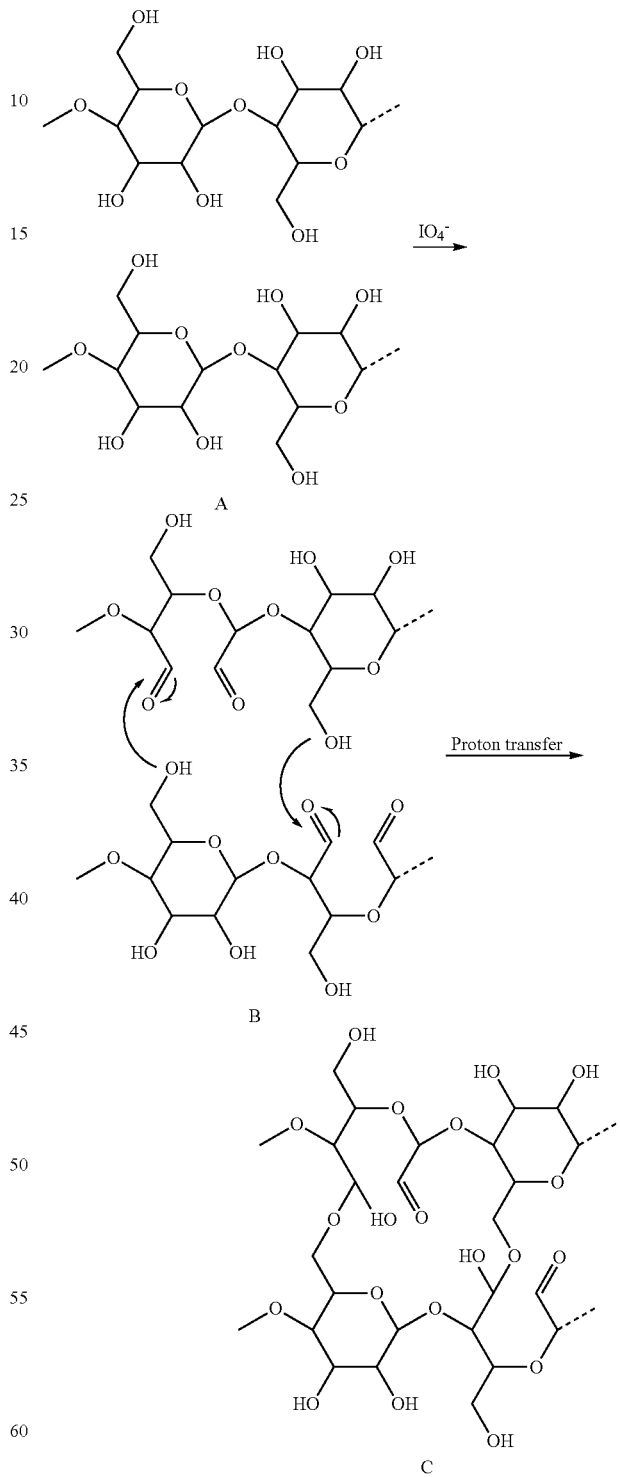

Scheme 1. Schematic representation of how the C2-C3 bonds of two cellulose chains (A) are oxidised into dialdehyde cellulose (B), and finally covalently cross-linked with each other (C). The aldehyde still available in (C) may cross-link with other available hydroxyl groups, possibly the C6 hydroxyl group, as suggested by Morooka et al. [23].

The present inventors have realized that to replace petroleum-based barriers used in, for example, packaging applications with a bio-based alternative, the sensitivity to moisture must be lowered. The present disclosure describes the fabrication and characterisation of cellulose-based films with remarkably improved oxygen and water-vapour-barrier properties at 80% or 90% relative humidity. This was achieved by fabricating films of self-cross-linking fibrillated cellulose after partial periodate oxidation to dialdehyde cellulose. At a relative humidity of 80%, films made of 27% and 44% oxidised cellulose, respectively, showed less than half the water permeability of the untreated reference; 3.8 g·mm/(m²·24 h·kPa) and 3.7 g·mm/(m²·24 h·kPa) compared to 8.0 g·mm/(m²·24 h·kPa). This was presumably due to a lower moisture uptake in the films, and consequently less swelling. In the absence of moisture, films from both unmodified and modified fibrillated cellulose were ideal oxygen barriers, but at a relative humidity of 80%, films based on 27% and 44% converted cellulose had an oxygen permeability of 2.2 ml·μm/(m²·24 h·kPa) and 1.8 ml·μm/(m²·24 h·kPa), respectively, compared to 9.2 ml·μm/(m²·24 h·kPa) for the non-oxidised material. At 90% relative humidity, the difference between the untreated and treated cellulose was even greater.

The present disclosure thus provides a package material comprising an oxygen barrier polymer film, wherein the film comprises a polymer obtainable by a process comprising the steps of:

a) oxidising cellulose fibers to ultimately obtain cross-linked cellulose; and b) homogenising the product of step a) to obtain fibrils in a width range of 1 nm to 150 nm.

The present disclosure further provides a package material comprising an oxygen barrier polymer film, wherein the film comprises a polymer obtainable by a process comprising the steps of:

a) oxidising cellulose fibers to a degree of 20-50% to ultimately obtain cross-linked cellulose; and b) homogenising the product of step a) to obtain fibrils in a width range of 1 nm to 150 nm.

The present disclosure also provides a package material comprising a polymer film as an oxygen barrier, wherein the film comprises a polymer obtainable by a process comprising the steps of:

a) oxidising cellulose fibers to a degree of 20-50% to ultimately obtain cross-linked cellulose; and b) homogenising the product of step a) by passing it through chambers having a pore size of 300-500 μm, 100-300 μm, 150-250 μm, and 50-150 μm, in sequential order, to obtain fibrils in a width range of 1 nm to 150 nm.

In addition, there is provided a use of a polymer film as an oxygen barrier film, wherein the polymer film comprises a polymer obtainable by a process comprising the steps of:

a) oxidising cellulose fibers to ultimately obtain cross-linked cellulose; and b) homogenising the product of step a) to obtain fibrils in a width range of 1 nm to 150 nm.

Further, there is provided a use of a polymer film as an oxygen barrier film, wherein the polymer film comprises a polymer obtainable by a process comprising the steps of:

a) oxidising cellulose fibers to a degree of 20-50% to ultimately obtain cross-linked cellulose; and b) homogenising the product of step a) to obtain fibrils in a width range of 1 nm to 150 nm.

Also, there is provided a use of a polymer film as an oxygen barrier film, wherein the polymer film comprises a polymer obtainable by a process comprising the steps of:

a) oxidising cellulose fibers to a degree of 20-50% to ultimately obtain cross-linked cellulose; and b) homogenising the product of step a) by passing it through chambers having a pore size of 300-500 μm, 100-300 μm, 150-250 μm, and 50-150 μm, in sequential order, to obtain fibrils in a width range of 1 nm to 150 nm.

Finally, there is provided a packaging material comprising a base material and an oxygen barrier film comprising cross-linked fibrillated cellulose as well as a package at least partly composed of the material.

DETAILED DESCRIPTION

Figure 1:
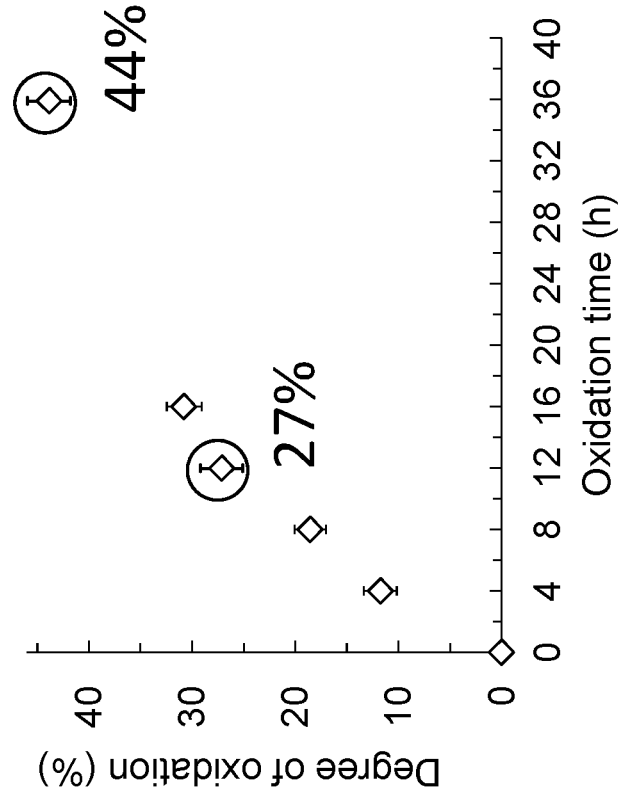
FIG. 1 shows an example of the increase in the degree of oxidation (%) according to Scheme 1 over time (h).

According to a first configuration of a first aspect of the present disclosure, there is provided a package material comprising an oxygen barrier polymer film, wherein the film comprises a polymer obtainable by a process comprising the steps of:

a) oxidising cellulose fibers to ultimately obtain cross-linked cellulose; and b) homogenising the product of step a) to obtain fibrils in a width range of 1 nm to 150 nm.

According to a second configuration of a first aspect of the present disclosure, there is provided a package material comprising an oxygen barrier polymer film, wherein the film comprises a polymer obtainable by a process comprising the steps of:

a) oxidising cellulose fibers to a degree of 20-50% to ultimately obtain cross-linked cellulose; and b) homogenising the product of step a) to obtain fibrils in a width range of 1 nm to 150 nm.

According to a third configuration of a first aspect of the present disclosure, there is provided a package material comprising a polymer film as an oxygen barrier, wherein the film comprises a polymer obtainable by a process comprising the steps of:

a) oxidising cellulose fibers to a degree of 20-50% to ultimately obtain cross-linked cellulose; and b) homogenising the product of step a) by passing it through chambers having a pore size of 300-500 μm, 100-300 μm, 150-250 μm, and 50-150 μm, in sequential order, to obtain fibrils in a width range of 1 nm to 150 nm.

The polymer film of the first aspect may be regarded as an oxygen and water vapour barrier film.

In embodiments of the first aspect, the cellulose fibers are oxidized to a degree of 25-45, 25-35, 25-30, 26-28, 30-50, 35-45, or 40-45%.

The oxidation of the first aspect may for example be performed using an oxidising agent, such as periodate.

There is also provided a package composed of the material of the first aspect.

According to a first configuration of a second aspect of the present disclosure, there is provided a use of a polymer film as an oxygen barrier film, wherein the polymer film comprises a polymer obtainable by a process comprising the steps of:

a) oxidising cellulose fibers to ultimately obtain cross-linked cellulose; and b) homogenising the product of step a) to obtain fibrils in a width range of 1 nm to 150 nm.

According to a second configuration of a second aspect of the present disclosure, there is provided a use of a polymer film as an oxygen barrier film, wherein the polymer film comprises a polymer obtainable by a process comprising the steps of:

a) oxidising cellulose fibers to a degree of 20-50% to ultimately obtain cross-linked cellulose; and b) homogenising the product of step a) to obtain fibrils in a width range of 1 nm to 150 nm.

According to a third configuration of a second aspect of the present disclosure, there is provided a use of a polymer film as an oxygen barrier film, wherein the polymer film comprises a polymer obtainable by a process comprising the steps of:

a) oxidising cellulose fibers to a degree of 20-50% to ultimately obtain cross-linked cellulose; and b) homogenising the product of step a) by passing it through chambers having a pore size of 300-500 μm, 100-300 μm, 150-250 μm, and 50-150 μm, in sequential order, to obtain fibrils in a width range of 1 nm to 150 nm.

The use of the second aspect may be as an oxygen and water vapour barrier film.

In embodiments of the second aspect, the use is at a relative humidity of 80% or 90%.

In embodiments of the second aspect, the cellulose fibers are oxidized to a degree of 25-45, 25-35, 25-30, 26-28, 30-50, 35-45, or 40-45%.

Further, in embodiments of the second aspect, the oxidation may be performed using an oxidising agent, such as periodate.

In the context of the present disclosure, the degree of oxidation is measured as described below under MATERIAL AND METHODS.

According to a third aspect of the present disclosure, there is provided a package material comprising a base material and an oxygen barrier film comprising cross-linked fibrillated cellulose. Various embodiments of the third aspect are described above in connection with the first and the second aspect.

Further, in an embodiment of the third aspect, the base material is paper or paperboard. The paper board may for example comprise one, two, three four or five paper layers.

In addition to the oxygen barrier film, the package material of the third aspect may comprise a water vapour barrier film. The water vapour barrier film may be provided between the base material and the oxygen barrier film. It may also be applied onto the oxygen barrier film, which means that the oxygen barrier film is sandwiched between the base material and the water vapour barrier film.

In embodiments of the third aspect, the water vapour barrier film comprises polyethylene (PE), polyamide, polyethylene terephthalate (PET) or ethylene vinyl alcohol (EVOH). The PE may for example be LDPE or HDPE.

Further, in embodiments of the third aspect, the fibrillated cellulose is cross-linked by intra- and/or inter-fibrillar covalent bonds involving C2 and/or C3. The skilled person is familiar with the structural meaning of C2 and C3. Further, the positions of C2 and C3 are evident from Scheme 1 above.

In embodiments of the third aspect, the water permeability of the oxygen barrier film is less than 5 g·mm/(m²·24 h·kPa) at a relative humidity of 80% and/or at a relative humidity of 90%.

Further, in embodiments of the third aspect, the oxygen permeability of the oxygen barrier film is less than 5 ml·μm/(m²·24 h·kPa), such as less than 4 ml·μm/(m²·24 h·kPa), such as less than 3.5 ml·μm/(m²·24 h·kPa), at a relative humidity of 80% and/or at a relative humidity of 90%.

There is also provided a package composed of the packaging material of the third aspect. The package may for example be a food or liquid package. The material of the third aspect may be liquid packaging board,

EXAMPLES

Materials and Methods

Fibres

Dried bleached kraft fibres (K44) were provided by SCA AB (Östrand pulp mill, Sweden). Before use, the fibres were soaked in water and disintegrated, and the carboxyl groups of the fibres were converted into their sodium form according to an earlier described procedure [11].

Chemicals

Sodium (meta)periodate for the oxidation of cellulose, isopropanol (≥99.8% purity) used as radical scavenger and hydroxylamine hydrochloride for the determination of the degree of oxidation were all purchased from Sigma-Aldrich. Polyethyleneimine (PEI), with a molecular weight of 60 kDa, used to promote fibril adsorption prior to AFM imaging, was purchased from Acros Organics. Other chemicals, such as hydrochloric acid and sodium hydroxide, were all of analytical grade.

Oxidation of Cellulose

Under stirring, 5.4 gram of sodium periodate per gram of fibre was added to a 4 g/l fibre suspension containing 6.3% isopropanol (by volume) as radical scavenger to prevent side reactions and chain scission [25, 26]. To further prevent chain scission, the oxidation reactions were performed in the dark [27] for 12 or 36 h before the reaction was terminated by filtration and thorough washing with deionised water. The degree of conversion to dialdehyde cellulose, assuming pure cellulose as starting material, was determined to be 27% and 44%, respectively (FIG. 1), by reaction with hydroxylamine hydrochloride and titration with sodium hydroxide according to an earlier described procedure [16, 28].

Fibril Preparation

Fibrillated cellulose was prepared from treated and untreated fibres by homogenisation (Microfluidics' Microfluidizer processor M-110 EH) of 4-5 g/l suspensions at a pressure of ca. 1600 bar. The fibres were pre-homogenised once through 400 μm and 200 μm chambers connected in series, before being homogenised ten times through 200 μm and 100 μm chambers connected in series. To minimise the risk of clogging, the untreated fibres were beaten for 6000 revolutions in a PFI mill prior to homogenisation.

Fibril Characterisation

To estimate the dimensions of the fibrils, a polished silicon wafer (MEMC Electronic Materials, Italy) with a pre-adsorbed PEI layer (5 min adsorption at 0.1 g/l) was dipped for 10 s in a 20 times diluted fibril suspension, followed by drying and Atomic Force Microscopy (AFM) in the tapping mode using a model MMP-12100-10 cantilever (Veeco Instruments' MultiMode IIIa).

Film Fabrication

Prior to film fabrication, the fibrillated cellulose was diluted to approximately 2.5 g/l and sonicated for 10 min in a VWR Ultrasonic Cleaner, followed by vacuum filtration using a 325×2300 mesh Twill Dutch Double Weave (BoppUtildi, Sweden) in a Rapid Kothen sheet former (Paper Testing Instruments, Austria), using an earlier described film-preparation method [29]. After filtration, a second metal weave was placed on top of the film and the whole assembly was dried for 15 min at 93° C. under a reduced pressure of 95 kPa. The films were stored at 23° C. and 50% RH until further analysis.

X-ray Diffraction

The crystallinity was evaluated by collecting X-ray diffraction (XRD) spectra of fibril films using an X'Pert Pro XRD (PANalytical). Diffractograms were recorded in the reflection mode in the angular range of 5-40° (2θ). CuKα radiation (1.5418 Å) was generated with an applied voltage of 45 kV and a current of 35 mA. An incremental step of 0.05° and a rate of 1 step per 10 s were used. Samples were dried in a desiccator with silica gel prior to the measurements.

Scanning Electron Microscopy

A high-resolution field-emission scanning microscope (FE-SEM) (Hitachi S-4800) was used to acquire micrographs of the fabricated films. In order to suppress specimen charging during imaging, the specimens were sputtered for 5-10 s using a Pt—Pd target in a 208 HR Cressington Sputter Coater.

Tensile Testing

Tensile testing was performed at 23° C. and 50% RH using an Instron 5944 with a 500 N load cell. Test pieces, 5 mm wide, were clamped with a free span of 40 mm and strained at a strain rate of 10%/min. Young's modulus (E) was determined from the slope of the stress-strain curve in the low-strain region in the vicinity of 0.05% strain.

Permeability Testing

The barrier properties of the films were evaluated on 5 $cm^2$ samples with respect to oxygen (Systech instruments' Model 8001 oxygen permeation analyser) and water vapour (MOCON PermaTran-W 3/33) according to the ASTM D-3985 and ASTM F1249-06 Standards, respectively. In terms of relative humidity, the oxygen permeability measurements were performed symmetrically, i.e. having the same relative humidity on both sides of the test specimen, whereas the water vapour permeability measurements were performed asymmetrically by feeding the detection side with dry nitrogen. Water vapour permeability was measured in quadruplicate and oxygen permeability in triplicate.

Moisture Sorption

The equilibrium moisture contents at the relative humidities used for the water vapour permeability measurements, and 90% RH, were determined by placing films on a balance located in a glove box connected to a moisture generator mixing dry and wet air currents in the appropriate proportions. Dry weights were determined by drying overnight at 105° C.

RESULTS AND DISCUSSION

Fibril Characterisation

Fibrils were produced by homogenisation, either from untreated fibres or after periodate oxidation to dialdehyde cellulose at two degrees of oxidation: 27% or 44%. AFM images of these fibrils show there are apparent differences between the differently treated fibrils, in terms of both size and their affinity for the PEI-coated silica surface. The reduced affinity confirms that there is a change in chemical composition and structure of the fibrils, caused presumably not only by the conversion to dialdehyde cellulose but also by the observed material loss of ca. 15% of the material during the oxidation and subsequent washing. The removed material consists mainly of hemicelluloses and, since these contain charged groups, the charge density of the modified fibrils, and consequently their affinity for the PEI-surface, is less than that of the unmodified fibrils. Besides this difference in adsorption, there is also a distinct difference in particle shape, size, and size distribution. The untreated fibrils have fibril widths ranging from 4 to 10 nm with some larger 20 nm aggregates, as is expected from fibrillated wood fibres [30, 31]. The surface with 27% oxidised fibrils, which has less surface coverage than the surface with untreated fibrils, contains a larger number of fibril aggregates, indicating that the fibres were more difficult to homogenise, due presumably to cross-links introduced between individual fibrils prior to homogenisation. Nevertheless, free fibrils are present, i.e. the fibril suspension had a high size polydispersity. When the fibres, prior to homogenisation, were further oxidised to 44% oxidation, there was even less adsorption, and there were fewer high-aspect-ratio aggregates than in the 27% oxidised material, but a significant amount of large low-aspect-ratio particles. Furthermore, the single fibrils of the 44% oxidations are very thin; 2-5 nm.

Figure 2:
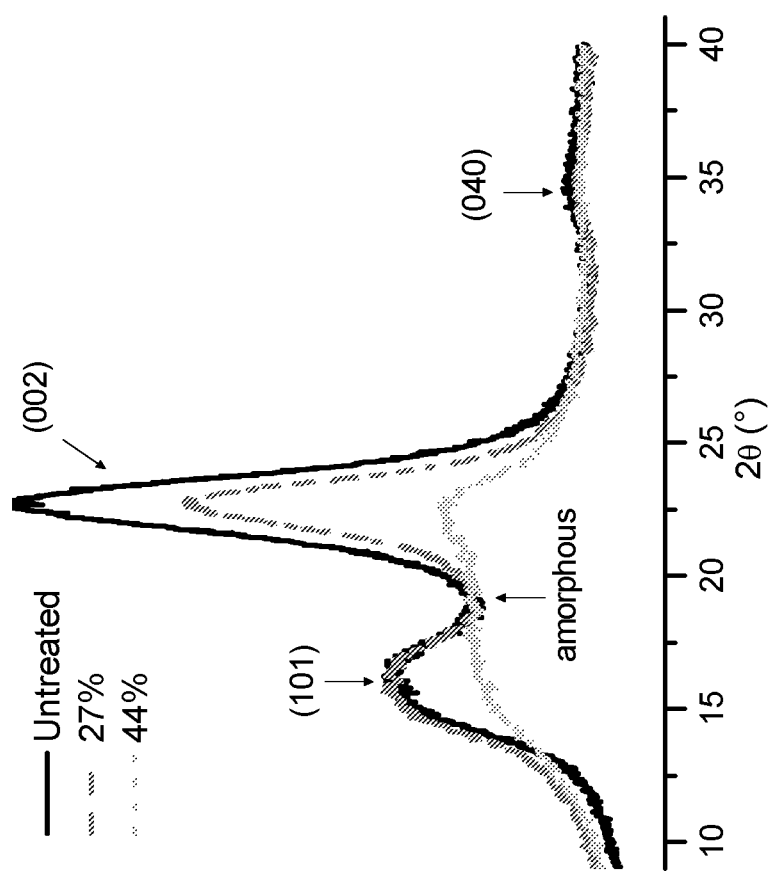
FIG. 2 shows X-ray diffraction spectra of films made from cellulosic fibrils, untreated and periodate oxidised to 27% or 44%. Crystalline planes, as well as the region corresponding to amorphous cellulose, are marked by arrows.

FIG. 2 shows XRD spectra of reference and modified fibrils and it is clear that the periodate oxidation significantly reduced the crystallinity of the material. The crystallinity index [32] decreased from 73% for the reference to 63% for the 27% oxidised material and 21% for the 44% oxidised material, well in accordance with earlier published results for periodate-oxidised cellulose [33, 34], and further treated dialdehyde cellulose [34, 35]. This presumably leads to thinner and more flexible fibrils [34], and is expected to affect the formation and mechanical properties of the films, as well as their barrier properties. The fact that periodate oxidation gradually reduces the crystallinity (FIG. 2), with a simultaneous decrease in crystallite width [36], also makes it plausible to assume that there is a heterogeneous oxidation process that leaves behind a fibril with a highly crystalline core and a cross-linked amorphous outer layer.

Film Fabrication and Mechanical Characterisation

As shown in Table 1, the time to fabricate the films was relatively short, i.e. it was fairly easy to dewater the fibril suspensions (without significant material loss; not shown).

Figure 3:
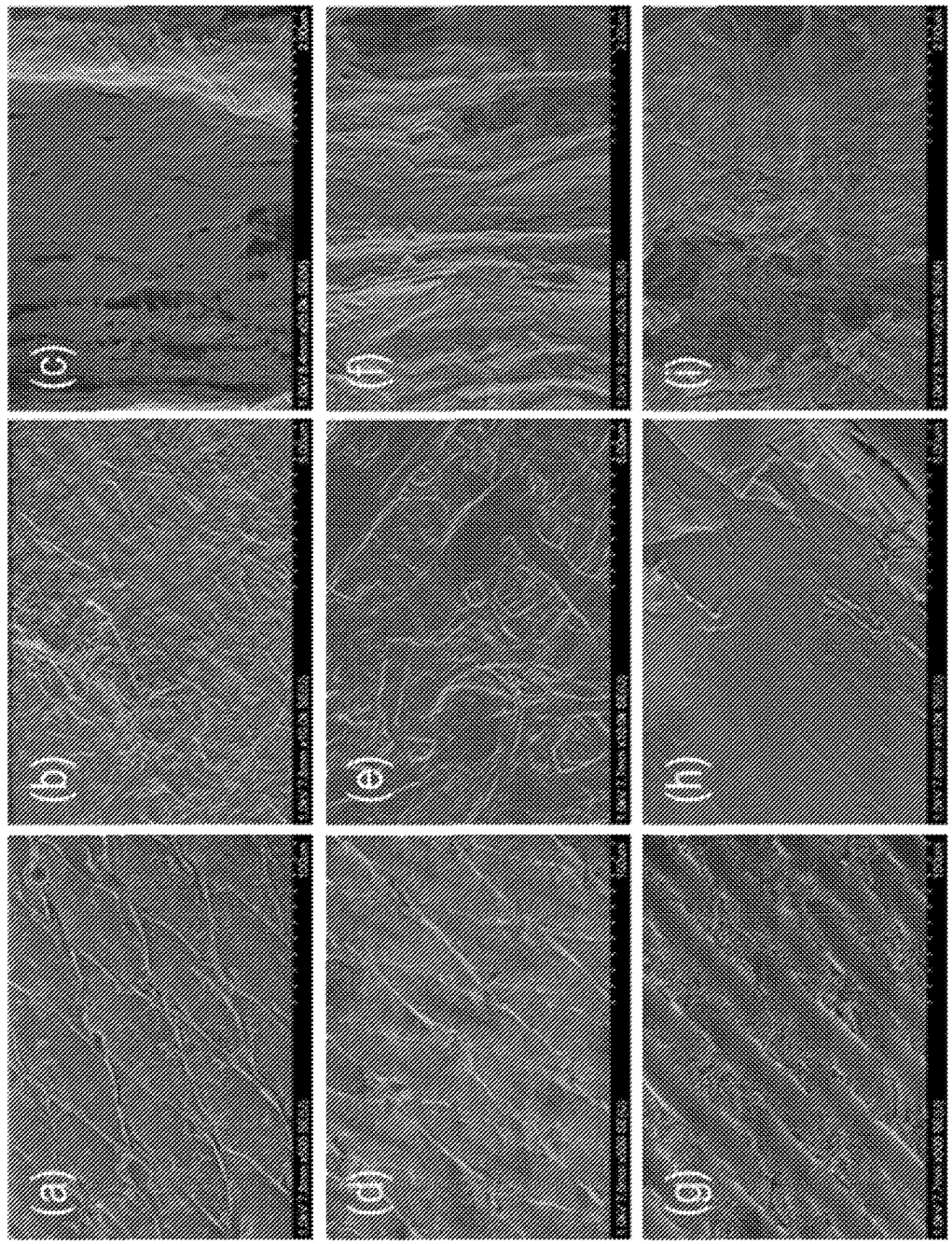
FIG. 3 shows SEM images of films made from homogenised kraft fibres that prior to homogenisation were (a-c) untreated, (d-f) 27% periodate oxidised, and (g-i) 44% periodate oxidised. The first and second columns show top-view images at 500 and 10 000 times magnification, and the third column shows cross-section views at 20 000 times magnification. The repeating patterns in the left-hand column are imprints of the filter and drying support.

The two grades of oxidised fibrils were also significantly easier to dewater than the untreated grade, which may be an effect of particle size. The films had densities 5-10% less than 1500 kg/m$^3$, i.e. the density of completely non-porous cellulose [37]. This, and the fact that the films were only semi-transparent, indicates that they were somewhat porous. This was further supported by microscopy investigations, where FIG. 3 shows SEM images of the three different films, all of which show the presence of small pores. The SEM images also support the difference in fibril size distribution found by AFM, i.e., the 27% oxidised material consisted of larger fibril aggregates than the untreated material (FIG. 3b compared to 3e). In FIGS. 3g-i, showing the 44% oxidised material, it is interesting to note the absence of any distinct fibrillar structure. The XRD spectrum (FIG. 2) for the same material shows a significantly lower crystallinity than the non-oxidised and 27% oxidised material. This is in agreement with earlier findings by Kim et al. [34], who reported a lower crystallinity and a greater fibril flexibility after periodate oxidation. The film made from the most highly oxidised material was also less homogeneous in its microstructure, showing a smoother cross-section with fewer pores closer to the filter side of the film (not shown). Possibly linked to these properties, the films made of the most highly oxidised fibrils showed a different, and more distinct, imprint of the metal wire weave used for filtration and drying support (FIG. 3g).

the difference in fibril size and differences in network structure (FIG. 3), which may affect the mechanical performance of the materials.

Film Gas Permeability

Figure 4:
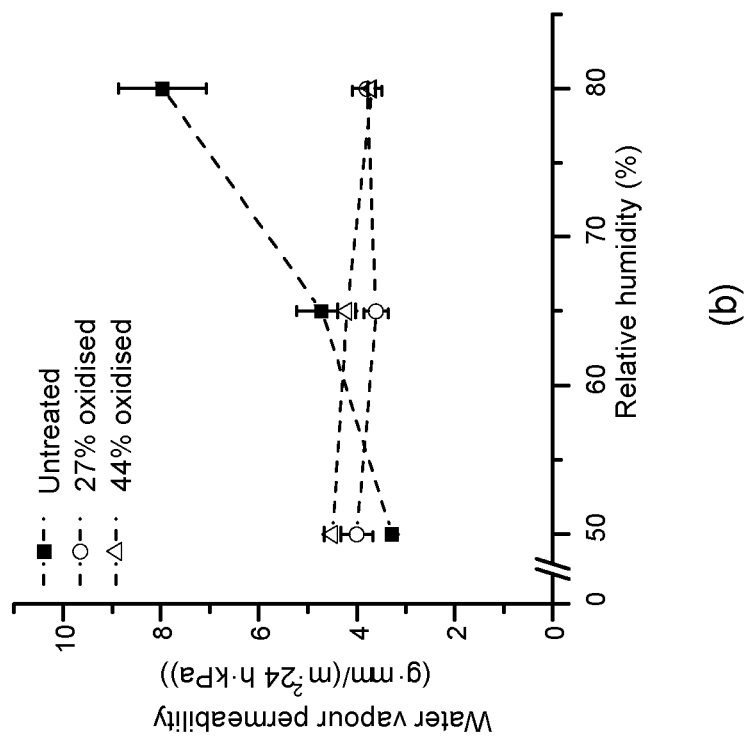
FIG. 4 shows permeability with respect to (a) oxygen and (b) water vapour as a function of relative humidity (up to 80%) of films made of untreated and two degrees of oxidised cellulose; 27% and 44%. Error bars indicate standard deviations (n=3 and n=4, respectively).
Figure 4:
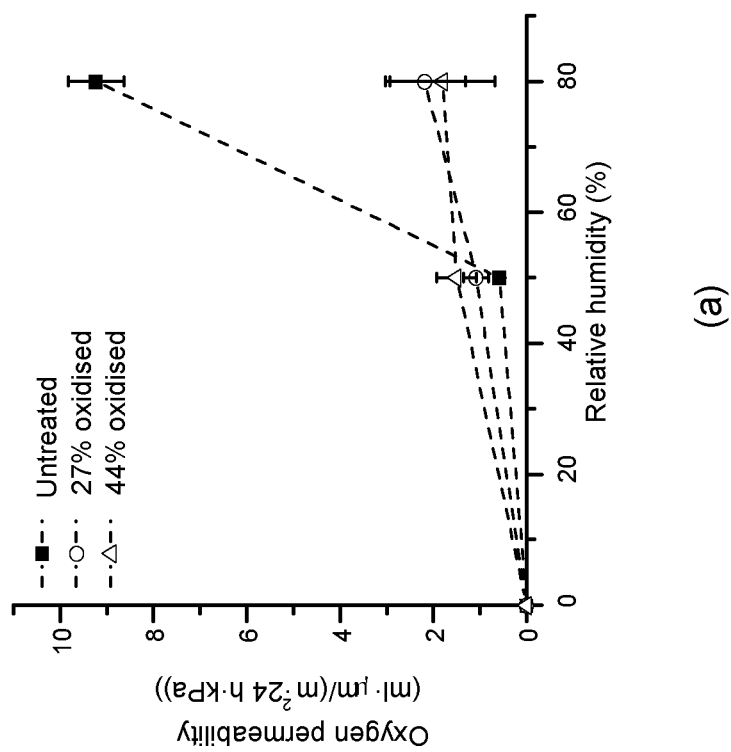

At 0% RH, all the films acted as ideal oxygen barriers and the oxygen permeability was below the detection limit of the instrument (0.008 ml/(m$^2$·24 h)), indicating a material with strong intra-molecular interaction and without interconnected pores, preventing the diffusion of non-polar gas molecules such as oxygen by any means other than as dissolved molecules. Evaluated at 50% RH, i.e. where the films are expected to contain moisture, the oxygen permeability ranged from 0.6 ml·μm/(m$^2$·24 h·kPa) for films made from untreated fibrils to 1.5 ml·μm/(m$^2$·24 h·kPa) for the most oxidised material (FIG. 4a). These values are comparable with those of other cellulose-based films [1, 2, 4, 8] and other films based on carbohydrates such as starch or hemicellulose, or carbohydrate-based nanocomposite [3, 5, 7, 9, 45, 46]. However, all these materials suffer from a significant deterioration in oxygen-barrier properties with increasing relative humidity. Typically there is an increase in oxygen permeability by one or two orders of magnitude when the relative humidity is increased from 50% RH to 80% RH [1, 2, 7-9], but, for the films fabricated from self-cross-linking cellulose, FIG. 4a shows that the permeabilities of the two oxidised grades remain unchanged when the relative humidity is increased to 80% RH, presumably

TABLE 1

Film filtration times and average structural and mechanical properties.
Tensile data are given with 95% confidence limits.

|  | Approx. filtration time (min) | Apparent density (kg/m$^3$) | Apparent thickness (μm) |
|---|---|---|---|
| Untreated | 24 | 1420 | 34 |
| 27% oxidised | 9 | 1400 | 43 |
| 44% oxidised | 11 | 1325 | 46 |

|  | Young's modulus (GPa) | Tensile stress at break (MPa) | Tensile strain at break (%) |
|---|---|---|---|
| Untreated | 10.1 (0.8) | 225 (22) | 6.08 (1.26) |
| 27% oxidised | 11.1 (0.5) | 148 (10) | 2.02 (0.35) |
| 44% oxidised | 6.0 (0.2) | 48 (15) | 0.99 (0.21) |

Figure 6:
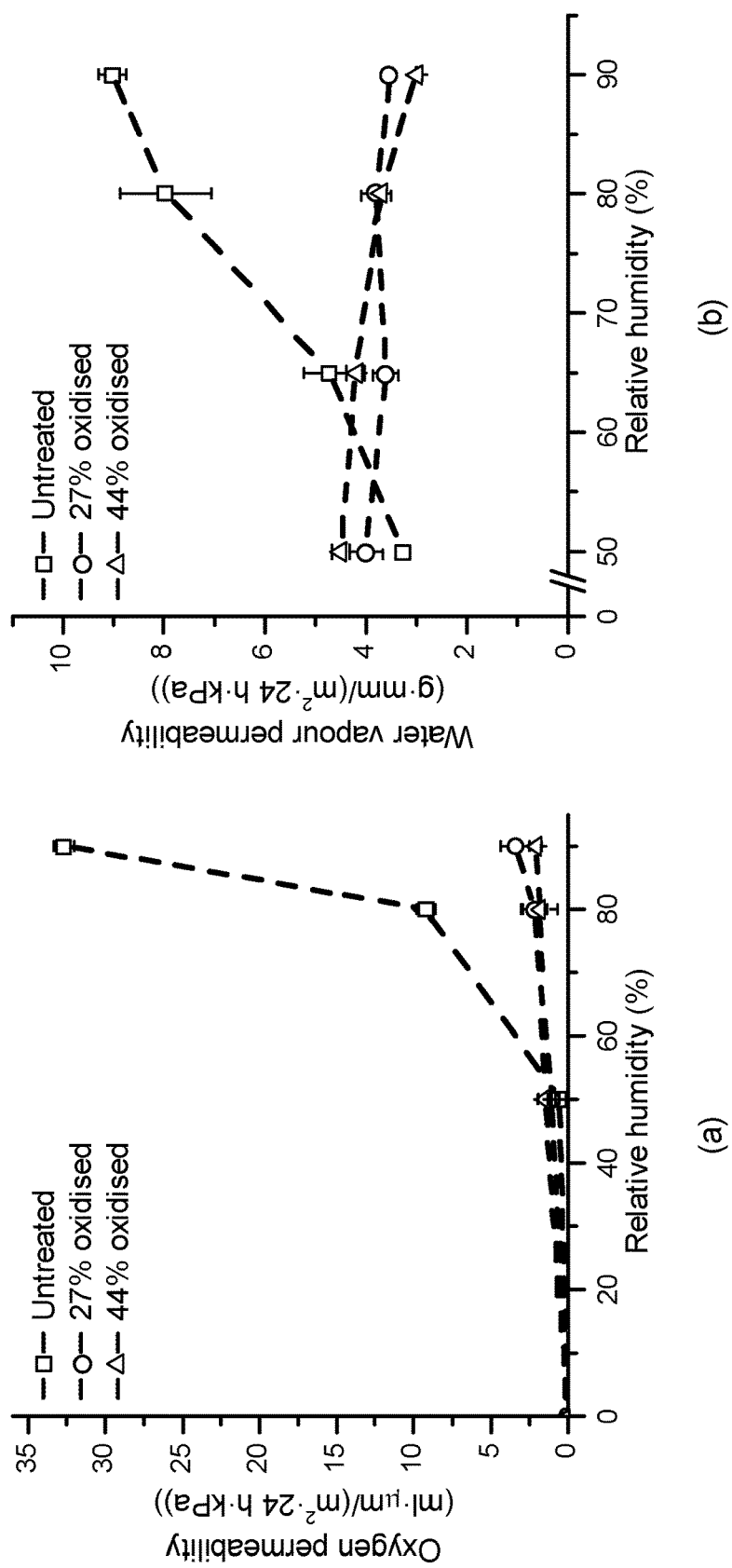
FIG. 6 shows permeability with respect to (a) oxygen and (b) water vapour as a function of relative humidity (up to 90%) of films made of untreated and two degrees of oxidised cellulose; 27% and 44%. It is notable from the figure that the modified films maintain an intact network structure
Figure 7:
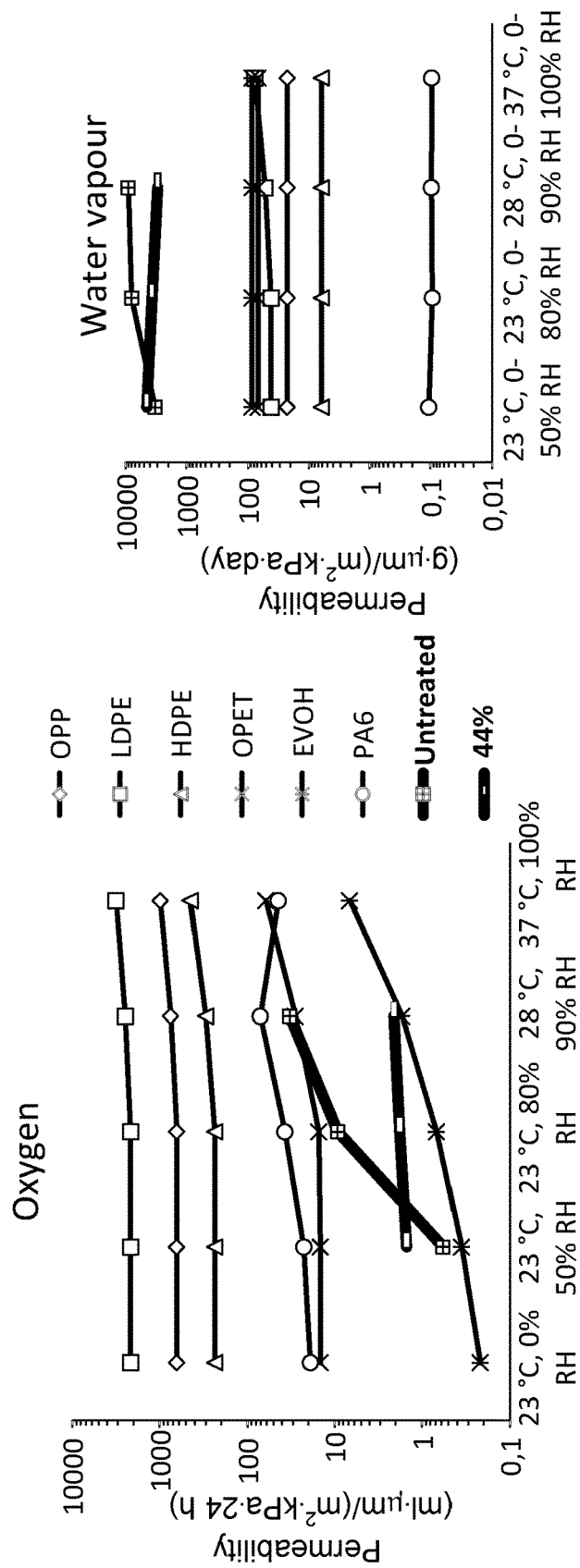
FIG. 7 shows the permeability with respect to (a) oxygen and (b) water vapour as a function of relative humidity (up to 90%) of films made of untreated or oxidised (44%) cellulose compared to the permeability of various plastics.

The mechanical performance of the films was significantly affected by the chemical modification. The bottom half of Table 1 shows the Young's modulus, tensile stress at break and tensile strain at break for the three different films. The films made of chemically untreated fibrils had mechanical properties similar to those reported earlier [29, 38], but, as can clearly be seen in Table 1, the chemical treatment made the films weaker and more brittle. This is well in agreement with earlier studies on the cross-linking of cellulose in general [15, 39-41], and on sodium-periodate-induced cross-linking in particular [16, 23, 42]. There is an indication of an (insignificant) increase in modulus compared to the untreated material when the cellulose is oxidised to 27% oxidation, but a distinct loss of modulus at 44% oxidation. An increase in modulus due to periodate-induced cross-links is plausible, since inter-fibrillar covalent cross-links are likely to lead to an improved stress transfer [43, 44]. However, since the periodate oxidation simultaneously reduced the material's crystallinity (FIG. 2) there was a net decrease in modulus at 44% oxidation. In a discussion of mechanical properties, it is also important to keep in mind because the fibrils are prevented from separating from each other and opening up greater diffusion paths for the oxygen molecules. At 90% RH, the effect of the treatment is even more apparent (FIG. 6a).

For polar molecules such as water vapour the trend was similar to that of oxygen permeability. FIG. 4b shows the water vapour permeability as a function of relative humidity, and the permeability remained at the same level between 50% RH and 80% RH for the oxidised grades, whereas the films made of untreated fibrils showed a significantly higher water vapour permeability at 80% RH than at 50% RH. The permeabilities of all three films at 50% RH (3.3-4.5 g·mm/(m$^2$·24 h·kPa)) were similar to that of other reported cellulose-based films [8, 12, 13], except that, for example, Yang et al. [8] reported a fourfold increase in permeability when the relative humidity was raised from 50% RH to 70% RH. In the case of the cross-linked cellulose in FIG. 4b the permeability was the same or even slightly lower at 80% RH. At 90% RH, the water vapour permeability was even lower than at 80% RH (FIG. 6b). These barrier properties both for oxygen and water vapour are therefore highly competitive compared to those of other carbohydrate-based barriers, but, the films are still significantly poorer barriers than most commercial synthetic polymers such as polypropylene, polyethylene or polyethylene terephthalate, which all typically have a water vapour permeability below 0.1 g·mm/(m$^2$·24 h·kPa) [11, 47].

Figure 5:
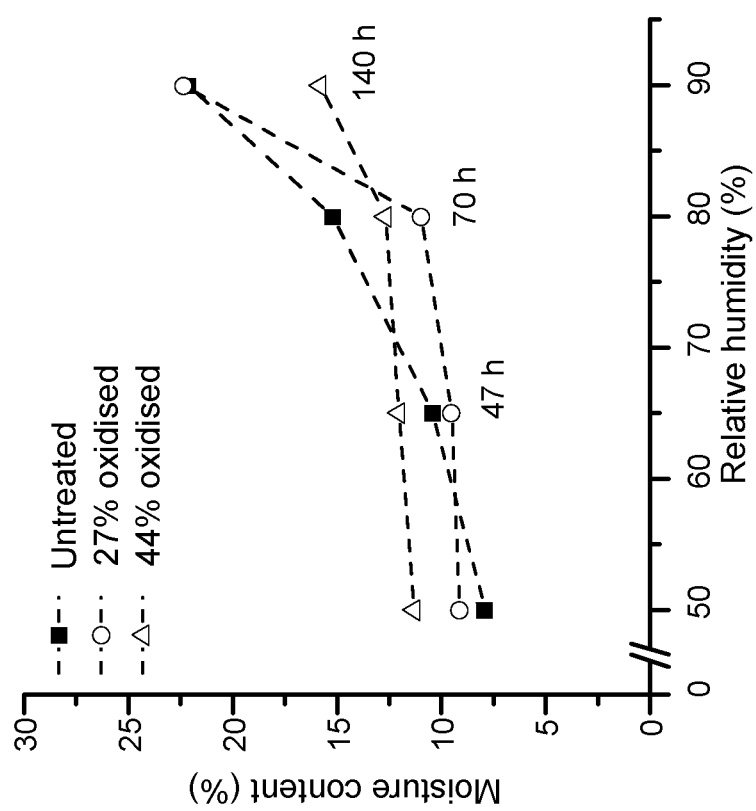
FIG. 5 shows equilibrium moisture content as a function of relative humidity for films made of untreated, 27% oxidised and 44% oxidised cellulose. The figures by the data points are approximate conditioning times at the respective relative humidities.

To elucidate the mechanism behind the unchanged oxygen and water vapour permeabilities of the treated samples with increasing relative humidity, the equilibrium moisture content was determined at the corresponding relative humidities. FIG. 5 shows how the two cross-linked films are more or less inert to moisture sorption in the relative humidity interval from 50 to 80% RH. FIG. 5 also shows that the most highly oxidised material had a higher equilibrium moisture content at 50% RH, which is probably a result of the larger amount of amorphous cellulose (FIG. 2) and which possibly explains why the water vapour permeability was slightly higher for this grade at 50% RH. The lack of any change in moisture content in the 50-80% RH interval shows that the cross-links formed between the fibrils prevent the adsorption and diffusion of moisture [16, 17], and limit swelling and the creation of surfaces and pores available for gas diffusion. Interestingly, the 27% oxidised films showed a rapid increase in moisture content when the relative humidity was further increased to 90%, which may indicate an increase in permeability at this, or higher, humidity if the increase in moisture content is accompanied by a structural change in the material. It has been suggested that the cross-links may partly hydrolyse with time at high relative humidity [16], but, this hypothesis was later rejected since soaking in water did not alter the molecular or supramolecular structure [48].

To further understand the sorption behaviour at high relative humidity and the corresponding barrier properties, further measurements are needed. Nevertheless, the present results show that these materials have a potential for use in e.g. the packaging of dry goods that are not too sensitive to moisture, but need protection from oxidising air.

Finally, from an application point of view, it is also important to note that these self-cross-linking fibrils can be used in other ways than as films. Fibrillated cellulose can, for example, be coated onto a substrate film or board and act as a barrier coating [1].

CONCLUSIONS

Films have been fabricated from homogenised cellulose fibres partly converted (27% or 44%) to dialdehyde cellulose by periodate oxidation of the cellulose C2-C3 bond. The aldehyde groups then enable the formation of intra- and inter-fibrillar covalent bonds which reduce the moisture adsorption, and hence film swelling, when exposed to high relative humidity, and consequently hinder the increase in gas permeability often associated with increasing relative humidity. The oxygen permeabilities of the 27% and 44% oxidised cellulose were 2.2 ml·µm/(m$^2$·24 h·kPa) and 1.8 ml·µm/(m$^2$·24 h·kPa), respectively, compared to 9.2 ml·µm/(m$^2$·24 h·kPa) for the untreated reference at 23° C. and 80% RH, and the corresponding water vapour permeabilities were 3.8, 3.7 and 8.0 g·mm/(m$^2$·24 h·kPa). The difference between treated and untreated samples was even bigger at 90% RH.

REFERENCES

1. C. Aulin, M. Gällstedt and T. Lindström. Oxygen and oil barrier properties of microfibrillated cellulose films and coatings. *Cellulose* 17:559-574, 2010.
2. C. Aulin, G. Salazar-Alvarez and T. Lindström. High strength, flexible and transparent nanofibrillated cellulose-nanoclay biohybrid films with tunable oxygen and water vapor permeability. *Nanoscale* 4(20):6622-6628, 2012.
3. U. Edlund, Y. Yu, Y. Zhu Ryberg, R. Krause-Rehberg and A.-C. Albertsson. Positron lifetime reveals the nano level packing in complex polysaccharide-rich hydrolysate matrixes. *Anal. Chem.* 84(8):3676-3681, 2012.
4. H. Fukuzumi, T. Saito, S. Iwamoto, Y. Kumamoto, T. Ohdaira, R. Suzuki and A. Isogai. Pore size determination of tempo-oxidized cellulose nanofibril films by positron annihilation lifetime spectroscopy. *Biomacromolecules* 12(11):4057-4062, 2011.
5. M. Gröndahl, L. Eriksson and P. Gatenholm. Material properties of plasticized hardwood xylans for potential application as oxygen barrier films. *Biomacromolecules* 5(4):1528-1535, 2004.
6. C. Johansson, J. Bras, I. Mondragon, P. Nechita, D. Plackett, P. Simon, D. G. Svetec, S. Virtanen, M. G. Baschetti, C. Breen, F. Clegg and S. Aucejo. Renewable fibers and bio-based materials for packaging applications—a review of recent developments. *BioResources* 7:2506-2552, 2012.
7. J. J. Kochumalayil, M. Bergenstråhle-Wohlert, S. Utsel, L. Wågberg, Q. Zhou and L. A. Berglund. Bioinspired and highly oriented clay nanocomposites with a xyloglucan biopolymer matrix: Extending the range of mechanical and barrier properties. *Biomacromolecules* 14(1):84-91, 2013.
8. Q. Yang, H. Fukuzumi, T. Saito, A. Isogai and L. Zhang. Transparent cellulose films with high gas barrier properties fabricated from aqueous alkali/urea solutions. *Biomacromolecules* 12(7):2766-2771, 2011.
9. Y. Z. Zhu Ryberg, U. Edlund and A.-C. Albertsson. Conceptual approach to renewable barrier film design based on wood hydrolysate. *Biomacromolecules* 12(4):1355-1362, 2011.
10. C. Aulin and T. Lindström. Biopolymer coatings for paper and paperboard. In Biopolymers—new materials for sustainable films and coatings, (ed. D. Plackett), pp. 255-276, John Wiley & Sons, Ltd, Chichester, UK, 2011.
11. N. M. L. Hansen and D. Plackett. Sustainable films and coatings from hemicelluloses: A review. *Biomacromolecules* 9(6):1493-1505, 2008.
12. F. Debeaufort and A. Voilley. Aroma compound and water vapor permeability of edible films and polymeric packagings. *J. Agric. Food Chem.* 42(12):2871-2875, 1994.
13. H. Yang, A. Tejado, N. Alam, M. Antal and T. G. M. Van De Ven. Films prepared from electrosterically stabilized nanocrystalline cellulose. *Langmuir* 28(20):7834-7842, 2012.
14. D. F. Caulfield and R. C. Weatherwax. Tensile modulus of paper wet-stiffened by crosslinking. In *Fibre-water interactions in papermaking: transactions of the symposium held at Oxford*, pp. 741-763, 1977.
15. W. E. Cohen, A. J. Stamm and D. J. Fahey. Dimensional stabilization of paper by catalyzed heat-treatment. *Tappi* 42:904-908, 1959.
16. P. A. Larsson, M. Gimåker and L. Wågberg. The influence of periodate oxidation on the moisture sorptivity and dimensional stability of paper. *Cellulose* 15:837-847, 2008.

17. P. A. Larsson and L. Wågberg. Diffusion-induced dimensional changes in papers and fibrillar films: Influence of hydrophobicity and fibre-wall cross-linking. *Cellulose* 17:891-901, 2010.
18. R. G. Lebel, R. W. Schwartz and O. Sepall. A novel approach to dimensional stabilization of paper. *Tappi* 51(2):79-84, 1968.
19. G. Moad. Chemical modification of starch by reactive extrusion. *Prog. Polym. Sci.* 36(2):218-237, 2011.
20. C. Peroval, F. Debeaufort, A. M. Seuvre, P. Cayot, B. Chevet, D. Despré and A. Voilley. Modified arabinoxylan-based films: Grafting of functional acrylates by oxygen plasma and electron beam irradiation. *J. Membr. Sci.* 233(1-2):129-139, 2004.
21. F. Chivrac, E. Pollet and L. Averous. Progress in nano-biocomposites based on polysaccharides and nanoclays. *Mat. Sci. Eng. R* 67(1):1-17, 2009.
22. S. Sinha Ray and M. Bousmina. Biodegradable polymers and their layered silicate nanocomposites: In greening the 21st century materials world. *Prog. Mater. Sci.* 50(8):962-1079, 2005.
23. T. Morooka, M. Norimoto and T. Yamada. Periodate oxidation of cellulose by homogeneous reaction. *J. Appl. Polym. Sci.* 38(5):849-858, 1989.
24. E. L. Back. Thermal auto-crosslinking in cellulose material. *Pulp Paper Mag. Can.* 68(4):T-165-T-171, 1967.
25. G. V. Buxton, C. L. Greenstock, W. P. Helman and A. B. Ross. Critical review of rate constants for reactions of hydrated electrons, hydrogen atoms and hydroxyl radicals (.OH/.O$^-$) in aqueous solution. *J. Phys. Chem. Ref. Data* 17(2):513-886, 1988.
26. T. J. Painter. Control of depolymerisation during the preparation of reduced dialdehyde cellulose. *Carbohydr. Res.* 179:259-268, 1988.
27. M. C. R. Symons. Evidence for formation of free-radical intermediates in some reactions involving periodate. *J. Chem. Soc.*:2794-2796, 1955.
28. H. Zhao and N. Heindel. Determination of degree of substitution of formyl groups in polyaldehyde dextran by the hydroxylamine hydrochloride method. *Pharm. Res.* 8(3):400-402, 1991.
29. H. Sehaqui, A. Liu, Q. Zhou and L. A. Berglund. Fast preparation procedure for large, flat cellulose and cellulose/inorganic nanopaper structures. *Biomacromolecules* 11(9):2195-2198, 2010.
30. L. Wagberg, G. Decher, M. Norgren, T. Lindström, M. Ankerfors and K. Axnäs. The build-up of polyelectrolyte multilayers of microfibrillated cellulose and cationic polyelectrolytes. *Langmuir* 24(3):784-795, 2008.
31. M. Pääkkö, M. Ankerfors, H. Kosonen, A. Nykänen, S. Ahola, M. Österberg, J. Ruokolainen, J. Laine, P. T. Larsson, O. Ikkala and T. Lindström. Enzymatic hydrolysis combined with mechanical shearing and high-pressure homogenization for nanoscale cellulose fibrils and strong gels. *Biomacromolecules* 8(6):1934-1941, 2007.
32. L. Segal, J. J. Creely, A. E. Martin and C. M. Conrad. An empirical method for estimating the degree of crystallinity of native cellulose using the x-ray diffractometer. *Text. Res. J.* 29(10):786-794, 1959.
33. Q. X. Hou, W. Liu, Z. H. Liu and L. L. Bai. Characteristics of wood cellulose fibers treated with periodate and bisulfite. *Ind. Eng. Chem. Res.* 46:7830-7837, 2007.
34. U.-J. Kim, S. Kuga, M. Wada, T. Okano and T. Kondo. Periodate oxidation of crystalline cellulose. *Biomacromolecules* 1:488-492, 2000.
35. J. Sirviö, H. Liimatainen, J. Niinimäki and O. Hormi. Dialdehyde cellulose microfibers generated from wood pulp by milling-induced periodate oxidation. *Carbohydr. Polym.* 86(1):260-265, 2011.
36. H. Liimatainen, M. Visanko, J. A. Sirviö, O. E. O. Hormi and J. Niinimaki. Enhancement of the nanofibrillation of wood cellulose through sequential periodate-chlorite oxidation. *Biomacromolecules* 13(5):1592-1597, 2012.
37. C. J. Malm, L. B. Genung and J. V. Fleckenstein. Densities of cellulose esters. *Ind. Eng. Chem. Res.* 39(11):1499-1504, 1947.
38. C.-N. Wu, T. Saito, S. Fujisawa, H. Fukuzumi and A. Isogai. Ultrastrong and high gas-barrier nanocellulose/clay-layered composites. *Biomacromolecules* 13(6):1927-1932, 2012.
39. R. G. Lebel, R. W. Schwartz and O. Sepall. A novel approach to dimensional stabilization of paper. *Tappi* 51:2:79A-84A, 1968.
40. A. J. Stamm. Dimensional stabilization of paper by catalyzed heat treatment and cross-linking with formaldehyde. *Tappi* 42:44-50, 1959.
41. R. C. Weatherwax and D. F. Caulfield. The pore structure of papers wet stiffened by formaldehyde crosslinking. I. Results from the water isotherm. *J. Colloid Interface Sci.* 67:498-505, 1978.
42. M. Gimaker, A.-M. Olsson, L. Salmén and L. Wågberg. On the mechanisms of mechano-sorptive creep reduction by chemical cross-linking. In *Advances in Pulp and Paper Research: Transactions of the 14th Fundamental Research Symposium held in Oxford*, (ed. S. I'anson), pp. 1001-1017, 2009.
43. A. Fonseca, T. Borders, R. Baughman and K. Cho. Load transfer between cross-linked walls of a carbon nanotube. *Phys. Rev. B* 81:045429-045421-045427, 2010.
44. F. Quero, S. Eichhorn, M. Nogi, H. Yano, K.-Y. Lee and A. Bismarck. Interfaces in cross-linked and grafted bacterial cellulose/poly(lactic acid) resin composites. *J. Polym. Environ.* 20(4):916-925, 2012.
45. S. Gaudin, D. Lourdin, P. M. Forssell and P. Colonna. Antiplasticisation and oxygen permeability of starch-sorbitol films. *Carbohydr. Polym.* 43(1):33-37, 2000.
46. A. Saxena, T. J. Elder, J. Kenvin and A. J. Ragauskas. High oxygen nanocomposite barrier films based on xylan and nanocrystalline cellulose. *Nano-Micro Lett.* 2:235-241, 2010.
47. M. Fereydoon and S. Ebnesajjad. Development of high-barrier film for food packaging. In Plastic films in food packaging—materials, technology, and applications, (ed. S. Ebnesajjad), pp. 71-92, William Andrew Publishing, Oxford, 2013.
48. P. A. Larsson, M. Gimåker, P. T. Larsson and L. Wågberg. Can moisture sorption in lignocellulosic fibres be prevented? In *8th International Paper and Coating Cehmistry Symposium*, pp. 253-256, Stockholm, Sweden. 2012.

The invention claimed is:
1. A package material comprising a base material and an oxygen barrier polymer film, wherein the base material is paper or paperboard, and the oxygen barrier polymer film comprises a polymer obtainable by a process comprising the steps of:
   a) oxidising cellulose fibers to dialdehyde cellulose to a degree of 20-50% to obtain self-cross-linked cellulose without further chemical modification; and
   b) homogenising the product of step a) to obtain fibrils in a width range of 1 nm to 150 nm;

wherein said oxygen barrier polymer film has an oxygen permeability less than 5 ml*μm/(m$^2$*24 h*kPa) at a relative humidity of at least 80%.

2. The package material of claim 1, wherein the film is an oxygen and water vapour barrier film.

3. The package material of claim 1, wherein the oxidation is performed using an oxidising agent.

4. The package material of claim 3, wherein the oxidation is performed using periodate.

5. The package material of claim 1, wherein said oxygen barrier polymer film has an oxygen permeability less than 4 ml*μm/(m$^2$*24 h*kPa) at a relative humidity of at least 80%.

6. The package material of claim 1, wherein said oxygen barrier polymer film has an oxygen permeability less than 3.5 ml*m/(m$^2$*24 h*kPa) at a relative humidity of at least 80%.

7. The package material of claim 1, wherein step b) comprises passing the product of step a) through chambers having a pore size of 300-500 μm, 100-300 μm, 150-250 μm, and 50-150 μm, in sequential order.

8. A package composed of the material according to claim 1.

9. A package material comprising a base material, an oxygen barrier polymer film, and a water vapour barrier film, wherein the oxygen barrier polymer film comprises a polymer obtainable by a process comprising the steps of:
 a) oxidising cellulose fibers to dialdehyde cellulose to a degree of 20-50% to obtain self-cross-linked cellulose without further chemical modification; and
 b) homogenising the product of step a) to obtain fibrils in a width range of 1 nm to 150 nm;
wherein the water vapour barrier film comprises polyethylene, polyamide, polyethylene terephthalate, or ethylene vinyl alcohol.

10. The package material of claim 9, wherein said oxygen barrier polymer film has an oxygen permeability less than 5 ml*μm/(m$^2$*24 h*kPa) at a relative humidity of at least 80%.

11. The package material of claim 9, wherein said oxygen barrier polymer film has an oxygen permeability less than 4 ml*μm/(m$^2$*24 h*kPa) at a relative humidity of at least 80%.

12. The package material of claim 9, wherein said oxygen barrier polymer film has an oxygen permeability less than 3.5 ml*μm/(m$^2$*24 h*kPa) at a relative humidity of at least 80%.

13. The package material of claim 9, wherein step b) comprises passing the product of step a) through chambers having a pore size of 300-500 μm, 100-300 μm, 150-250 μm, and 50-150 μm, in sequential order.

14. The package material of claim 9, wherein the oxidation is performed using an oxidising agent.

15. The package material of claim 14, wherein the oxidation is performed using periodate.

16. A package composed of the material according to claim 9.

* * * * *

UNITED STATES PATENT AND TRADEMARK OFFICE
CERTIFICATE OF CORRECTION

PATENT NO. : 10,384,424 B2
APPLICATION NO. : 14/916689
DATED : August 20, 2019
INVENTOR(S) : Larsson et al.

Page 1 of 1

It is certified that error appears in the above-identified patent and that said Letters Patent is hereby corrected as shown below:

On the Title Page

Item (30): delete "1300586" and insert -- 1300586-3 --

In the Claims

Column 15, Line 14, Claim 6: delete "ml*m/" and insert -- ml*μm/ --

Signed and Sealed this
Third Day of December, 2019

Andrei Iancu
*Director of the United States Patent and Trademark Office*